United States Patent [19]

Jensen

[11] Patent Number: 5,179,682

[45] Date of Patent: Jan. 12, 1993

[54] METHOD AND APPARATUS FOR IMPROVED CURRENT WINDOW CACHE WITH SWITCHABLE ADDRESS IN, OUT, AND LOCAL CACHE REGISTERS

[75] Inventor: Eric H. Jensen, Livermore, Calif.

[73] Assignee: Sun Microsystems, Inc., Mountain View, Calif.

[21] Appl. No.: 524,214

[22] Filed: May 15, 1990

[51] Int. Cl.$^5$ .................. G06F 12/06; G06F 9/34
[52] U.S. Cl. .................. 395/425; 364/DIG. 1; 364/231; 395/400; 395/650
[58] Field of Search ... 364/200 MS File, 900 MS File; 395/400, 425

[56] References Cited

U.S. PATENT DOCUMENTS

| | | | |
|---|---|---|---|
| 4,734,852 | 3/1988 | Johnson et al. | 364/200 |
| 4,811,208 | 3/1989 | Myers et al. | 364/200 |
| 4,891,753 | 1/1990 | Budde et al. | 364/200 |
| 4,947,366 | 8/1990 | Johnson | 364/200 |
| 5,083,263 | 1/1992 | Joy et al. | 395/425 |

OTHER PUBLICATIONS

"RISC Architecture" by Daniel Tabak, copyright 1987, John Wiley & Sons Inc., pp. 30-33 & 47.

Primary Examiner—Joseph L. Dixon
Assistant Examiner—Reba I. Elmore
Attorney, Agent, or Firm—Blakely Sokoloff Taylor & Zafman

[57] ABSTRACT

A processor which has a plurality of windowed registers. Each of the windowed registers comprise IN, OUT and LOCAL window registers. The IN registers of each window are addressable as the OUT registers of a logically-adjacent succeeding window. The processor also has a cache of at least four sets of cache registers with switchable addresses. Each set of cache registers is capable of holding data of the IN, OUT or LOCAL window registers. The addresses of each set of cache registers are changed to the addresses of a different set of cache registers when the current window changes during a save or restore operation.

12 Claims, 10 Drawing Sheets

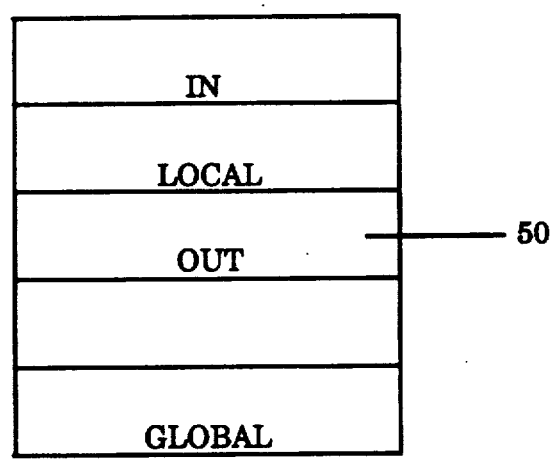
FIGURE 5 A
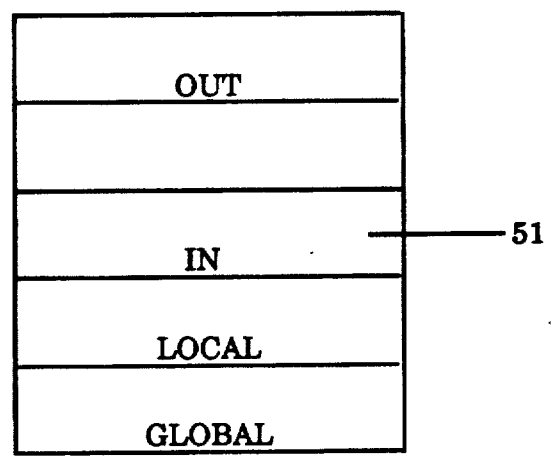
FIGURE 5 B
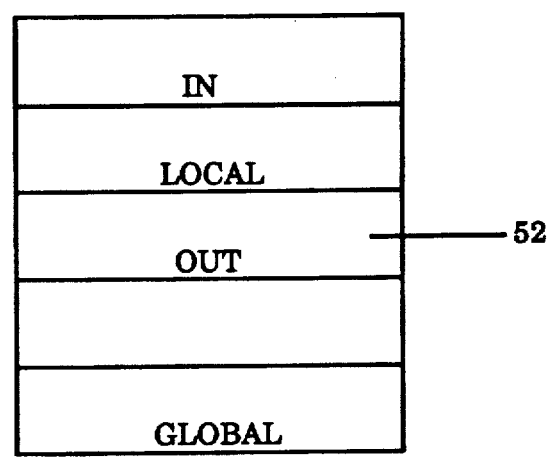
FIGURE 5 C
*Figure 5*

METHOD AND APPARATUS FOR IMPROVED CURRENT WINDOW CACHE WITH SWITCHABLE ADDRESS IN, OUT, AND LOCAL CACHE REGISTERS

BACKGROUND OF THE INVENTION

1. Field of the Invention:

This invention relates to computer systems and, more particularly, to methods and apparatus for implementing processors used in reduced instruction set computers.

2. History of the Prior Art:

The development of digital computers has progressed through a series of stages beginning with processors which were able to carry out only a few basic instructions which were programmed at a machine language level and continuing to processors capable of handling very complicated instructions written in high level languages. At least one of the reasons for this development has been that high level languages are easier for programmers to use, and thus more programs are developed more rapidly. Another reason is that up to some point in the development, the more advanced machines executed operations more rapidly.

There came a point, however, where the constant increase in the ability of the computers to run more complicated instructions actually began to slow the operation of the computer over what investigators felt was possible with machines operating with only a small number of basic instructions. These investigators began to design advanced machines for running a limited number of instructions, a so-called reduced instruction set, and were able to demonstrate that these machines did, in fact, operate more rapidly for some types of operations. Thus began the reduced instruction set computer which has become known by its acronym, RISC.

One design of a RISC computer is based on the Scalable Process Architecture (SPARC) designed by Sun Microsystems, Inc., Mountain View, Calif., and implemented in the line of SPARC computers manufactured by that company. One salient feature of the SPARC computers is the design of the processors, especially the architecture of the general purpose registers.

The general purpose registers include from forty to five hundred and twenty 32 bit registers. Whatever the total number of general registers, these registers are partitioned into eight global registers and a number of sixteen registers sets, each set divided into eight IN and eight local registers. At any time, an instruction can access a window including the eight global registers, the IN and local registers of one set of registers, and the IN registers of a logically-adjacent set of registers. These IN registers of the logically-adjacent set of registers are addressed as the OUT registers of the sixteen register set of the window including both IN and local registers. Thus, an instruction can access a window including the eight global registers, the IN and local registers of one set of registers, and the IN registers (addressed as OUT registers) of the logically adjacent set of registers.

This architecture provides a number of advantages not the least of which is that the processor may switch from register set to register set without having to save memory and restore all of the information being handled by a particular register set before proceeding to the operation handled by the next register set. For example, since the IN registers of one register set are the same registers as the OUT registers of the preceding set of registers, the information in these registers may be utilized immediately by the next or previous sets of registers without the necessity of saving the information to memory and writing the information to the IN registers of the next set of registers. This saves a great deal of system operating time. Moreover, the large number of register sets which may be utilized in the SPARC architecture allows a great number of operations to be implemented simultaneously, in many cases without the need to save to memory and restore before proceeding with the operation in any particular register set. This offers great speed advantages over other forms of RISC architecture.

However, no matter how philosophically advanced the SPARC architecture, it requires implementation in hardware. One such implementation, described in U.S. patent application Ser. No. 07/437,978, entitled Method and Apparatus for Current Window Cache, Eric H. Jensen, filed Nov. 16, 1989, includes a processor made up of a large register file usually constructed of random access memory divided into a plurality of sets of windowed registers. In accordance with the general SPARC architecture, each such set includes a first plurality of IN registers and a second plurality of local registers. The IN registers of each set are addressable as the OUT registers of a logically-adjacent preceding set of registers while the OUT registers of each set are addressable as the IN registers of a logically-adjacent succeeding set of registers. A set of global registers which may be addressed with each of the sets of registers is provided along with circuit means for indicating which set of windowed registers is being addressed.

The processor also includes an arithmetic and logic unit and a cache memory comprising a number lines at least equal to the total of the number of registers in an addressable set of windowed registers including the set of global registers, a set of IN registers, a set of OUT registers, and a set of local registers. The cache is provided with circuitry for changing the addresses of lines of the cache holding information presently designated as information held in OUT registers to addresses designating the IN registers of the next register set and vice versa. This arrangement essentially functions as a very rapid processor by using the registers of the cache in most cases in place of the normal register file. The use of the cache for processing allows cache speeds to be attained most of the time in processing even though the register file is constructed of relatively inexpensive random access memory and includes a very large number of window sets. The use of circuitry for changing the addresses of lines of the cache holding information presently designated as information held in OUT registers to addresses designating the IN registers of the next register set and vice versa allows the single set of IN, OUT, local, and global registers of the cache to accomplish in a single cache window the transfer between windowed sets without most of the store and restore operations which usually requires multiple windowed register sets.

Such a cache based processor functions well to increase the speed of operation of a SPARC based processor. There seems to be no upper level to the speed desired from a processor, however; and consequently even faster operation is desirable.

SUMMARY OF THE INVENTION

It is, therefore, an object of the present invention to provide an especially fast implementation of the SPARC processor architecture.

It is another more specific object of the present invention to improve the operation of a processor which utilizes a fast cache as an implementation of the SPARC architecture.

These and other objects of the present invention are realized in a processor which includes a register file including registers addressable in a plurality of sets of windowed registers, each set including a first plurality of IN registers, a second plurality of local registers, a third plurality of OUT registers, a fourth plurality of global registers; an arithmetic and logic unit; a cache memory comprising a number lines at least equal to the total of the number of registers in an addressable set of windowed registers; circuitry for changing the addresses of lines of the cache memory holding information presently designated in a particular window register set as information held in OUT registers to addresses designating the new IN registers of the next register set upon a store operation; circuitry for changing the addresses of lines of the cache memory next physically succeeding the new IN registers to addresses for local registers; and circuitry for changing the addresses of lines of the cache memory next physically succeeding the new local registers to addresses for OUT registers.

These and other objects and features of the invention will be better understood by reference to the detailed description which follows taken together with the drawings in which like elements are referred to by like designations throughout the several views.

BRIEF DESCRIPTION OF THE DRAWINGS

FIG. 5 is a diagram illustrating a second arrangement of registers within three logically-associated register windows in operations utilizing the invention.

NOTATION AND NOMENCLATURE

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to apparatus and to method steps for operating a computer in processing electrical or other (e.g. mechanical, chemical) physical signals to generate other desired physical signals.

DETAILED DESCRIPTION OF THE INVENTION

Figure 1:
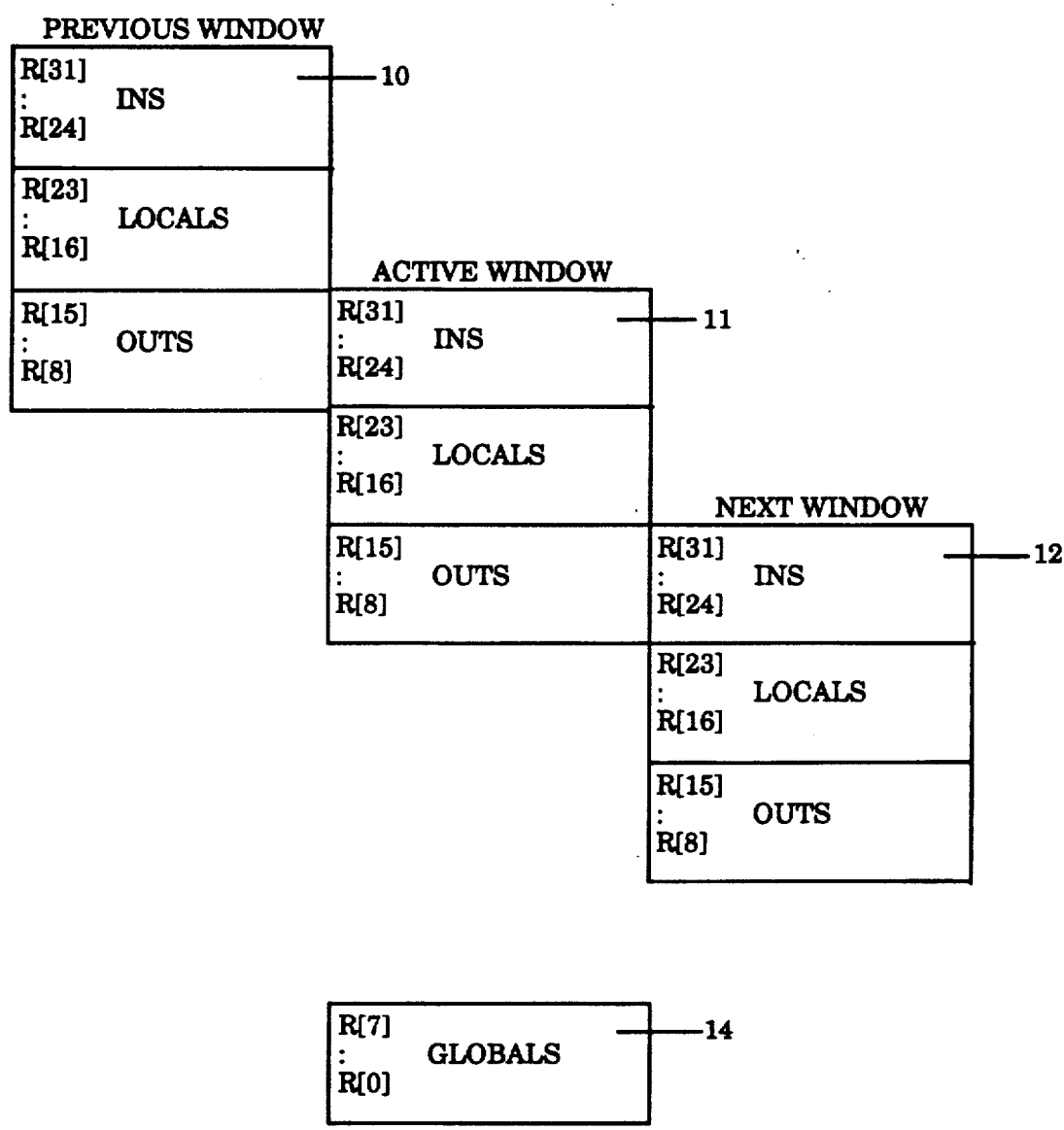
FIG. 1 is a block diagram illustrating three logically-adjacent sets of register windows in the SPARC architecture.

Referring now to FIG. 1 there is shown a diagram of a portion of the general registers of an integer processor used in a SPARC architecture RISC computer. Three register windows 10, 11, and 12 are shown together with the set of global registers 14 common to all of the register windows 10, 11, and 12. In the arrangement shown there are eight global registers r(0) through r(7) and three registers sets of twenty-four registers each set designated r(8) through r(31). Each set of registers includes eight OUT registers r(8) through r(15), eight local registers r(16) through r(23), and eight IN registers r(24) through r(31). The particular register sets may be implemented in random access memory or in any of a number of other well known ways.

When the registers of a particular register window are utilized in an operation by the processor, information is transferred to the IN registers of a particular register window and the results of the operation are placed in the OUT registers. The IN registers of each of the logically-adjacent register windows are, however, the same physical registers as the OUT registers of the preceding register window. Consequently, when an operation in register window 10 places results in its OUT registers, those results are, without more, resident in the IN registers of register window 11 since the registers are physically the same. Thus, operations which would normally require that values in registers be stored in memory before a next operation and later restored to the registers before their next use may be implemented by switching between a plurality of register windows without the need to store and restore results. The use of overlapping IN and OUT registers eliminates even the need to accomplish an actual write operation to accomplish the transfer between registers in many instances.

Figure 2:
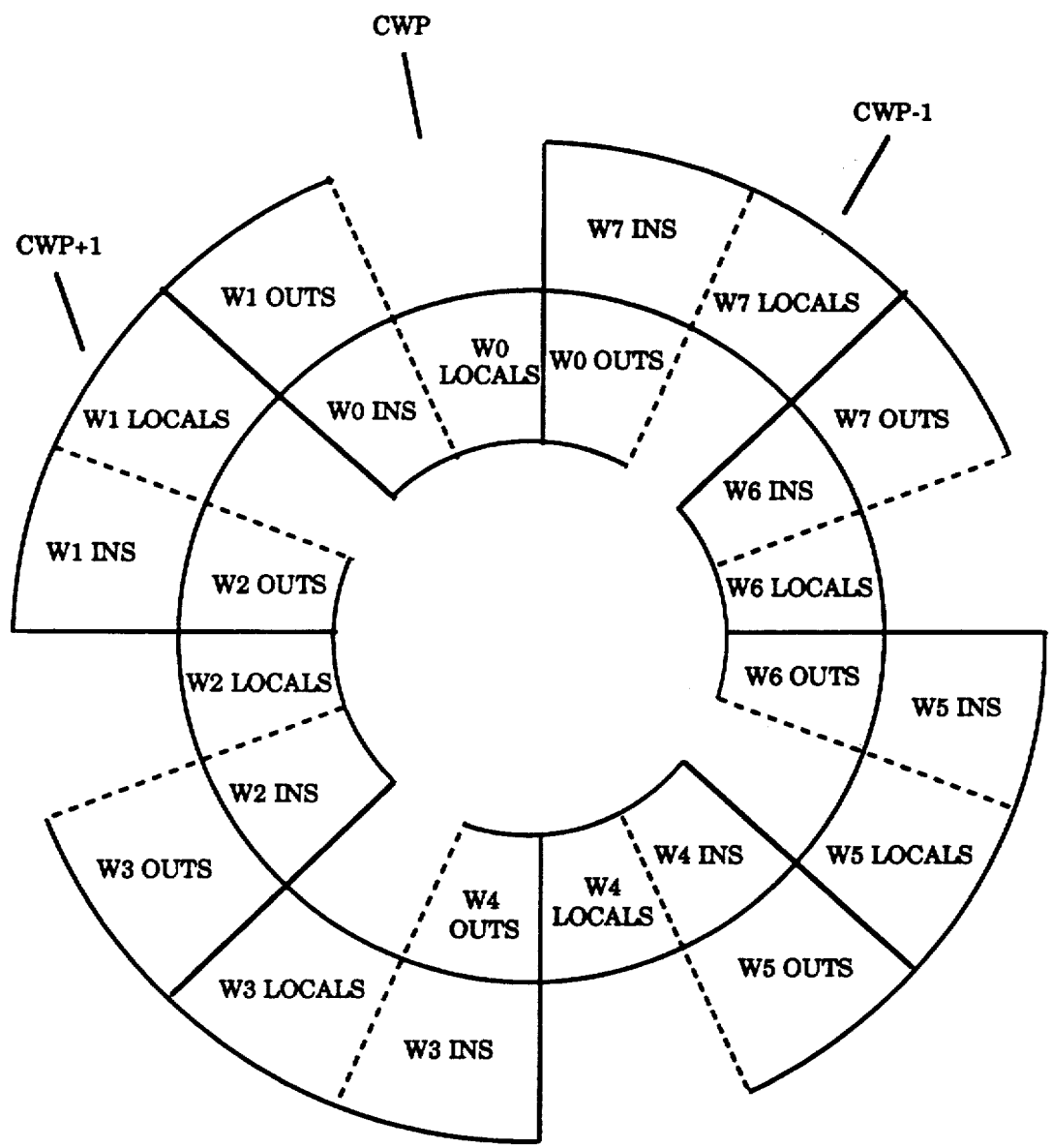
FIG. 2 is a diagram illustrating an array of register windows in the SPARC architecture.

FIG. 2 illustrates a small complete logical set of eight register windows in a SPARC architecture arrangement. It will be noted that the arrangement resembles an infinite set of register windows since each register window is associated with its immediately preceding and succeeding register windows. A current window pointer cwp held in the status/control registers designates the register window presently carrying out an operation. The register window designated by the pointer cwp+1 is the register window just preceding the current register window, the OUT registers of which are the IN registers of the current register window. The register window designated by the pointer cwp−1 is the register window just succeeding the current register window, the IN registers of which are the OUT registers of the current register window. In order to address any particular register in a particular register window, the current window pointer is incremented to the particular window and a register address is used to select the particular register.

A very fast arrangement for implementing the SPARC architecture is disclosed in the above-mentioned patent application. This implementation utilizes a processor made up of a large register file usually constructed of random access memory divided into a plurality of sets of windowed registers. In accordance with the general SPARC architecture, each such set includes IN registers, local registers, and OUT registers. As described, the IN and OUT registers of each window set are physically the OUT and IN registers of the two logically-adjacent sets of registers. A single set of global registers which may be addressed with each of the sets of registers is provided along with circuit means for indicating which set of windowed registers is being addressed. An arithmetic and logic unit is provided for manipulating information in the various sets of register windows.

In order to accelerate the operations of the processor, a cache memory is also provided. The cache memory comprises a number of lines at least equal to the total of the number of registers in an addressable set of windowed registers including the block of global registers, a block of IN registers, a block of OUT registers, and a block of local registers. The processor is provided with circuitry for changing the addresses of lines of the cache holding information presently designated as information held in OUT registers to addresses designating the IN registers and vice versa. This arrangement essentially functions as a very rapid processor by using the registers of the cache in most cases in place of the registers of the normal register file. The use of the cache for processing allows cache speeds to be attained most of the time in processing even though the register file is constructed of relatively inexpensive slow random access memory and includes a very large number of window sets. The use of circuitry for changing the addresses of lines of the cache holding information presently designated as information held in OUT registers to addresses designating the IN registers and vice versa allows the single set of IN, OUT, local, and global registers of the cache to accomplish in a single cache window the transfer between windowed sets without most of the store and restore operations.

The present invention utilizes an arrangement somewhat like that disclosed in the aforementioned patent application including a cache for speeding the operation of the processor but utilizes a different arrangement for addressing the registers of the cache in order to obtain increased performance.

Figure 3:
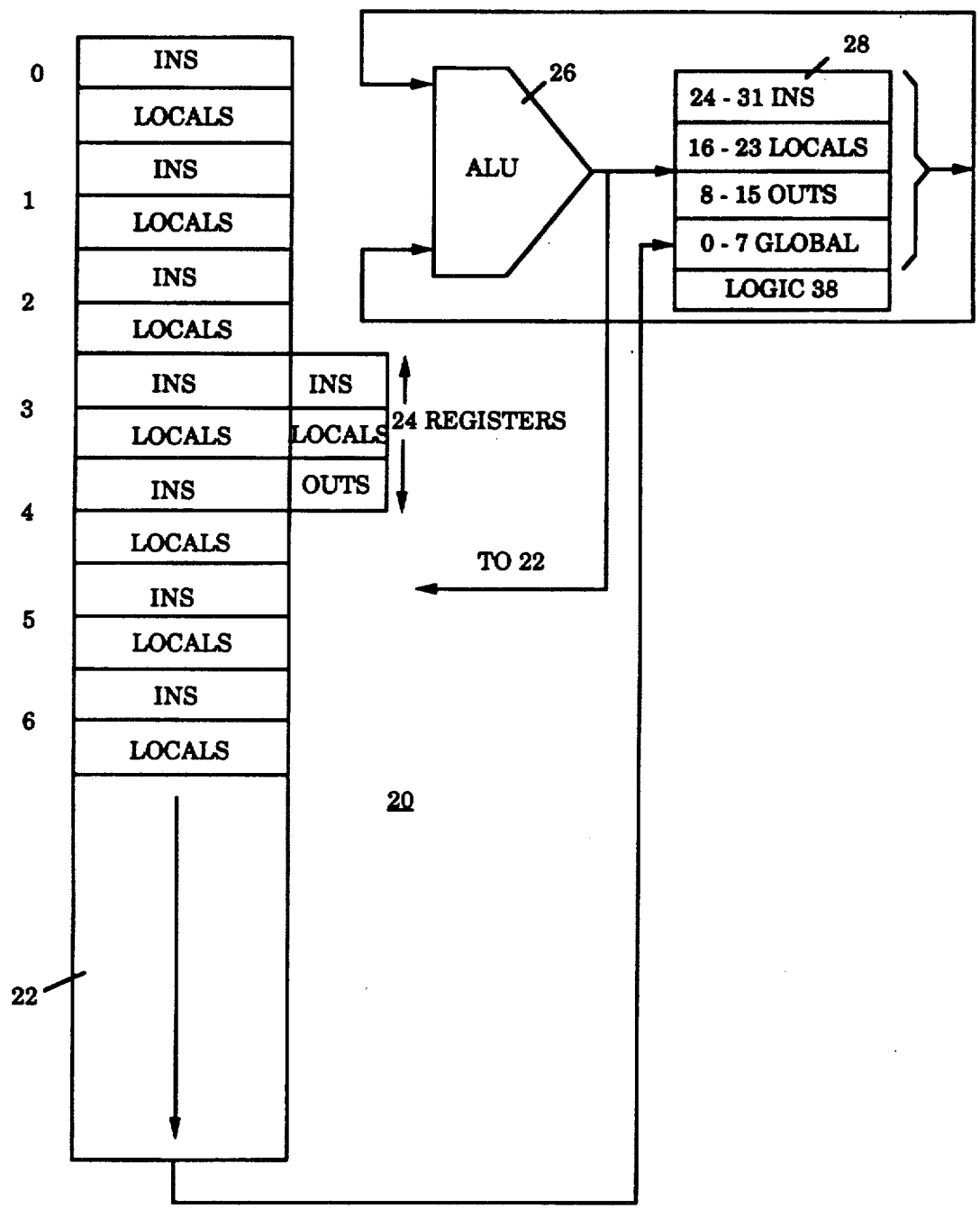
FIG. 3 is a block diagram illustrating an improved current window cache constructed in accordance with the invention.

FIG. 3 illustrates a processor constructed in accordance with the invention to carry out the SPARC architecture. The processor 20 illustrated in FIG. 3 includes a backing storage area 22 of register files which in a preferred embodiment may be constructed of random access memory. In the preferred embodiment of the invention, the storage area 22 is divided into thirty-two windows each including sixteen 32-bit registers, a block of eight IN registers and a block of eight local registers. As in other examples of the SPARC architecture, the IN registers of each window are addressed as the OUT registers of the immediately preceding window. Thus, the IN registers illustrated for window 3 are also the OUT registers for window 2 immediately above; and the IN registers illustrated for window 4 are also the OUT registers for window 3 immediately above. This is illustrated in the dotted area to the right of window 3 in the figure.

In the preferred embodiment of the invention, the storage area 22 may be addressed in twenty-four register increments along with a set of global registers to form a register window. In the preferred embodiment of the invention, the storage area may be constructed of random access memory. The register windows of the storage area 22 are associated with an arithmetic and logic unit 26 which may access the register windows of the storage area 22 in order to carry out the functions of a processor. In the normal operation of a SPARC-based computer, the register windows of the storage area 22 are used with the arithmetic and logic unit 26 to carry out the processor functions.

However, in order to make much more rapid the operation of the processor 20, a unique arrangement including a current window cache 28 has been devised. The current window cache 28 is similar to the current window cache of the above-referenced patent application and may be constructed of very fast random access memory and contain a number of lines sufficient to provide storage for the registers of one register window in the SPARC architecture. Thus, in the preferred embodiment, the current window cache 28 includes thirty-two lines of storage so that it may store information in a block of eight IN registers, a block of eight local registers, a block of eight OUT registers, and a block of eight global registers. As outlined above, each of these registers is capable of storing thirty-two bits of information. Since the information held in global registers is used with all register windows, the eight global registers of the current window cache may be used, as well, as the global registers for the entire register file storage area 22.

The arrangement illustrated in FIG. 3 for the registers may be termed for the purpose of this explanation the standard register arrangement in the current cache window 28. As may be seen, the global registers are designated and addressed as registers 0 through 7, the OUT registers as registers 8 through 15, the local registers as registers 16 through 23, and the IN registers as registers 24 through 31. These register designations within the current window cache 28 may be considered to function as offsets into the cache from the base address designated by the current window pointer (cwp) which selects the operative register window.

The current window cache 28 functions as do other caches and as does the cache described in the above-mentioned patent application. When information in the memory storage area 22 is addressed for use, a copy of that information is stored in the cache 28. Upon a next access of the addressed information, the cache 28 is consulted first and if the information is contained therein it is utilized without the necessity of addressing the slower operating memory of storage area 22. Consequently, cache memory speeds may be attained for a great percentage of the operation.

In order to retain the advantage offered by the SPARC architecture, the addressing logic for the cache 28 is arranged in an unusual manner, however. The cache 28 is provided with logic 38 so that register addresses within the cache are changed with the change between register windows (as the current window pointer is incremented and decremented) so that the cache lines which act as the OUT registers of a first register window become the cache lines which function as the IN registers of the succeeding register window on what would be a save operation, and the lines which act as the IN registers of a first register window become the lines which function as the OUT registers of the preceding register window on what would be a restore operation. By providing logic 38 in the cache 28 to accomplish this function, the information already held in the OUT registers of one register window becomes the information held in the next register window IN registers on a save operation while the information already held in the IN registers of the original register window becomes the information for the OUT registers of the preceding register window in a restore operation. Moreover, since the information in the global registers remains constant from window to window, only the information in the local register cache lines and either the IN or the OUT register cache lines (depending on the direction of operation) needs to be changed.

In the invention disclosed in the previous patent application, this result was achieved by an addressing arrangement which operated to switch addresses only for the IN and OUT registers of the cache 28; the local and global addresses always remained the same. In the present invention, in contrast, the addresses of all of the IN, OUT, and local registers are switched as a new adjacent window register set is entered, and only the global registers remain in the same positions. This offers distinct advantages when larger caches are used as will be understood from the description which follows.

To enhance the speed of operation of the current window cache 28, upon a restore operation in which the current window switches to the next preceding window, the valid bit is cleared before the switch for each register in lines of the cache 28 holding the current window's local registers and its OUT registers. In this way the cache lines holding information invalid for the new window are automatically marked as invalid without any addressing or testing so that they may be filled by information in the appropriate lines from the new window accessed in the storage area 22.

Figure 4:
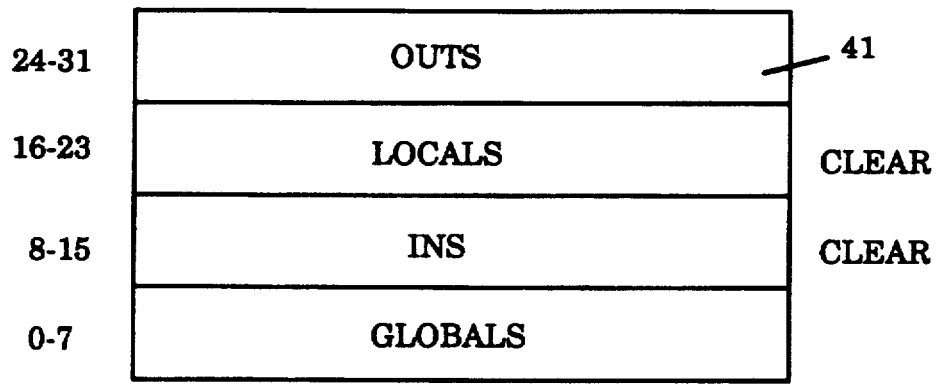
FIG. 4 is a diagram illustrating an arrangement of registers within three logically-associated register windows in operations utilizing the invention.
Figure 4:
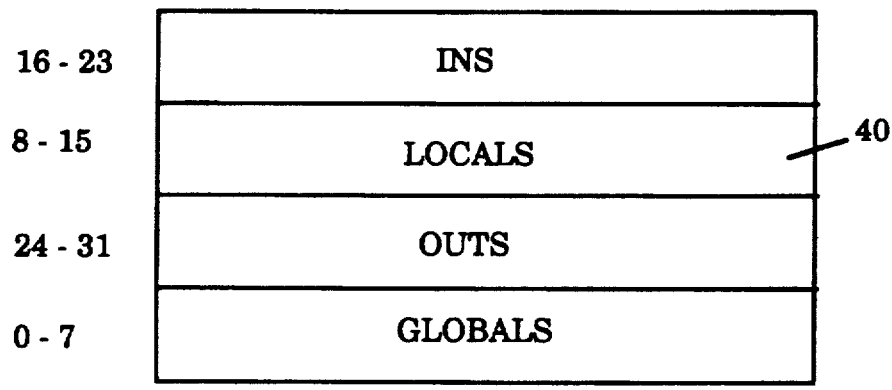
Figure 4:
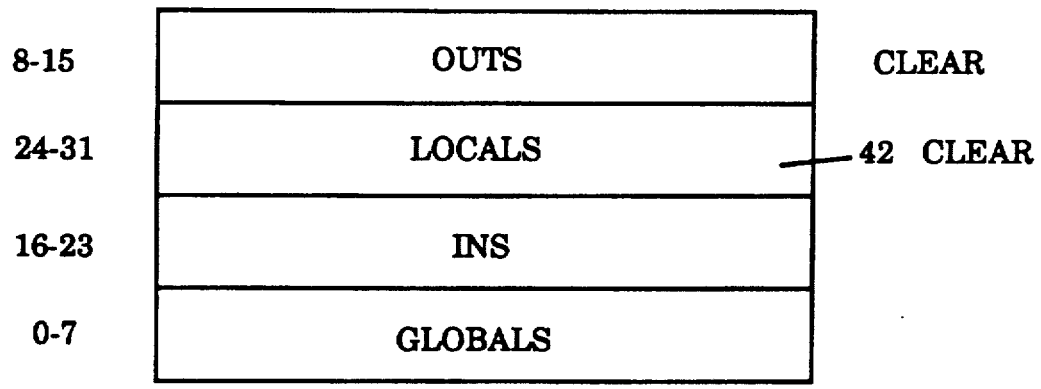

FIG. 4 illustrates three different arrangements of the cache 28. The upper arrangement 40 is the current window, the center arrangement 41 illustrates the next succeeding window which will occupy the cache 28 when a first SAVE operation takes place, and the lower arrangement 42 illustrates the succeeding window which will occupy the cache 28 when a second SAVE takes place. As may be seen, the cache line addresses utilized in the upper arrangement 40 are those shown in FIG. 3. When the processor completes its operation in the arrangement 40 and moves to the arrangement 41, a SAVE occurs, the OUT registers of the window shown in arrangement 40 become the IN registers of the window shown in arrangement 41. Thus the addresses 8-15 designating the OUT registers of the window in arrangement 40 are changed to the addresses 24-31 designating the IN registers of the window shown in arrangement 41. In addition, the addresses 24-31 of the IN registers of the arrangement 40 are changed to the addresses 16-23 designating local registers of the window shown in arrangement 41. At the same time, the addresses 16-23 designating the local registers of the arrangement 40 are changed to the addresses 8-15 designating OUT registers of the window shown in arrangement 41.

As may be seen, this change of addresses allows the information in the global and OUT registers of the arrangement 40 to remain in the same registers of the cache 28 and be used as the global and IN registers of the arrangement 41. It also allows the lines of the other register blocks to be filled with the appropriate information from the storage area 22 for the succeeding window set.

In a similar manner, when the processor completes its operation in the register window illustrated in arrangement 41 and moves to the window of arrangement 42, a SAVE occurs, the OUT registers of the window shown in arrangement 41 become the IN registers of the window shown in arrangement 42. Thus, the addresses 8-15 for the OUT registers of the arrangement 41 are changed to the addresses 24-31 designating IN registers of the window shown in arrangement 42. The addresses 24-31 for the IN registers of the arrangement 41 are changed to the addresses 16-23 designating local registers of the window shown in arrangement 42, and the addresses 16-23 for the local registers of the arrangement 41 are changed to the addresses 8-15 designating OUT registers of the window shown in arrangement 42.

When, on the other hand, a restore operation occurs and the values of the preceding register window set are placed in the cache 28, the IN registers of the cache 28 become the OUT registers of the preceding set. For example, the IN registers addressed as registers 24-31 in the set illustrated as arrangement 42 have their addresses change to addresses 8-15 to designate the OUT registers of the arrangement 41. In like manner, the local registers of arrangement 42 have their addresses changed to designate IN registers of arrangement 41, and the OUT registers of arrangement 42 have their addresses changed to designate local registers of arrangement 41 upon a restore operation. Upon a restore operation, the blocks utilized as OUT and local registers of the old window are designated as invalid by clearing a valid bit in the address so that the old information is not used.

Although the new addressing and validation logic for the present invention provides little advantage over the arrangement disclosed in the above-described patent application when using a limited set of registers such as is shown in FIG. 4, a similar arrangement may substantially speed the operation of the system. In such an arrangement, at least one an additional block of eight registers is utilized in the cache 28 to provide storage for information. Such an arrangement is depicted in FIG. 5. In this arrangement, information is first furnished to the upper three sets of registers in the order used is the previous arrangement, i.e., IN, local, OUT. However, in the new arrangement 50 the lower block of eight registers (excluding the block used for global registers) is unused. Upon a SAVE taking place, the lines holding the OUT registers of the arrangement 50 become the IN registers of the arrangement 51, the empty registers receive the new local information, and the IN registers of arrangement 50 are used for the new OUT registers of arrangement 51. This leaves the lines holding the local register information from the previous arrangement 50 as unneeded for this window set. It is only when a next SAVE operation occurs (as in a move to the window set illustrated at arrangement 52) that is it necessary to use the lines used as local registers in arrangement 50 so that new local information for arrangement 52 may be placed therein. In arrangement 52, the OUT registers of arrangement 51 become the IN registers, and the IN registers of arrangement 51 may be filled with the OUT information of the new window. Again, the register space used for the local registers of the previous arrangement 51 is not needed for the window set of arrangement.

Since the local information in an immediately preceding window arrangement (such as arrangement 50) need not be destroyed when a SAVE occurs in this scheme of operation, when a restore occurs and the IN registers of a stage become the OUT registers of the previous stage, the information in both the IN and the local registers is immediately available without any need to access the register file in the storage area 22 for that information. For example, if operating at window arrangement 51, when a restore operation occurs, the IN registers hold the information which is to be placed in the OUT registers of arrangement 50 so that only the addresses need be changed. Moreover, the lines holding the local registers of arrangement 50 which were unused in arrangement 51 still hold the same information which is necessary for the local registers of the arrangement 50 when a restore occurs. Consequently, this information need not be accessed in the register file, only the addresses used to access local registers in the cache 28 needs to be changed. The only information (if any) that needs to be accessed in the register file is the information to be placed in the IN registers of the arrangement 50.

Moreover, since the registers used for the local registers in arrangement 51 are not needed in the arrangement 50, the information in those registers need not be invalidated. Consequently, if a SAVE operation then occurs, the local register information for the arrangement 51 is immediately available without the need to access the register file. It should be noted that this is not the case for a generic cache 28 including N blocks of eight registers.

Figure 6:
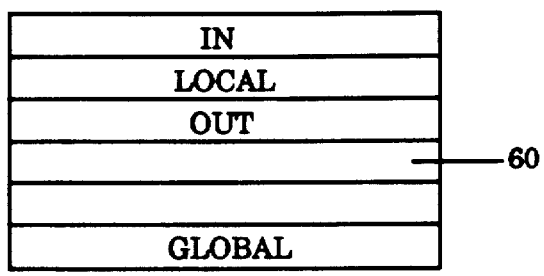
FIG. 6 is a diagram illustrating a third arrangement of registers within three logically-associated register windows in operations utilizing the invention.
Figure 6:
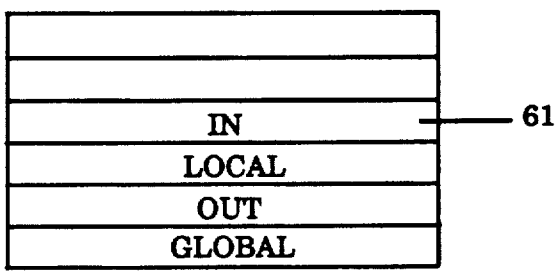
Figure 6:
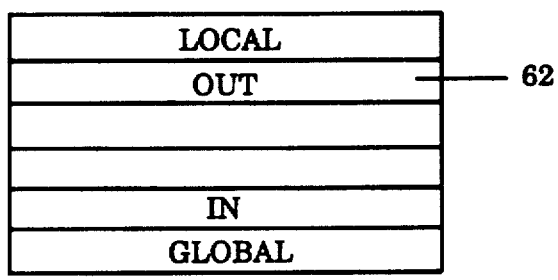
Figure 6:
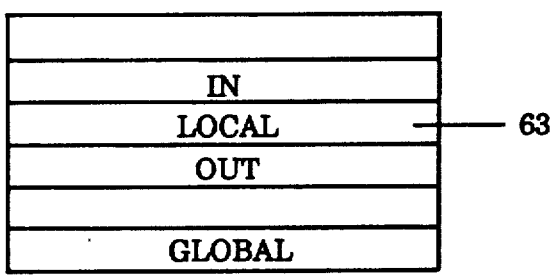
Figure 6:
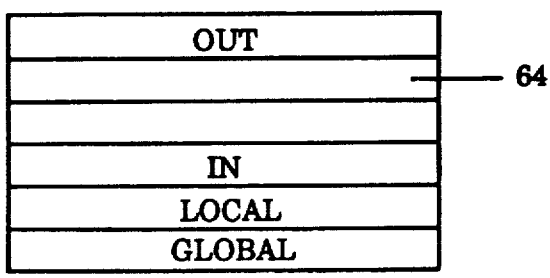

It will be recognized that additional blocks of eight registers may be added and utilized in a similar manner when it is desired to further speed the operation of the processor. For example, one, two, three or more additional blocks of eight registers may be added to the cache arrangement used in the processor. At the present time, the use of a single set of eight additional registers appears to be the optimum arrangement. However, particular arrangements of addressing may prove to offer advantages in particular cases. FIG. 6 illustrates a cache memory utilizing two additional blocks of eight registers. In this arrangement, five individual physical definitions of registers may occur. However, it should be noticed that any two adjacent arrangements (for example 60 and 61) uses only three of the five possible sets of eight registers. The unused registers in each case are the registers used in the preceding arrangement for the IN and local registers. Consequently, those registers do not have to be invalidated for a single SAVE operation and still hold the IN register and local register information which may be used in case of a restore operation.

Figure 7:
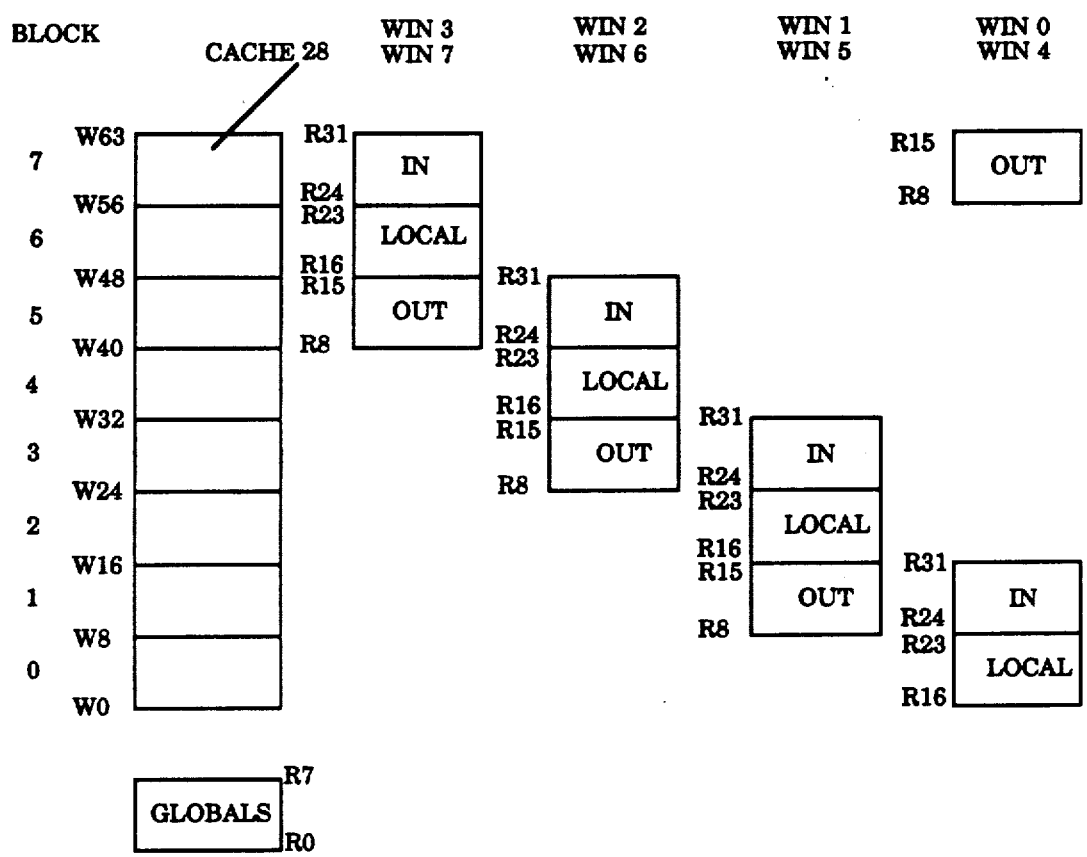
FIG. 7 illustrates a general arrangement of eight block of registers which may be utilized in understanding the addressing arrangement of the invention.

The following logical operations provide the appropriate changes of address and invalidation of register sets to accomplish those desireable results outlined above when the cache 28 is provided with eight blocks of eight registers in addition to the block of eight registers used to store global values. Such an arrangement is shown in FIG. 7. Addressing arrangements in accordance to this teaching for other numbers of cache windows will be apparent to those skilled in the art for caches made up of additional register sets. In deriving such addressing logic, it is only necessary to keep in mind that the OUT registers of a first window become the IN registers of the succeeding window upon a save operation, that the IN, local, and OUT registers appear in that physical order in the next succeeding register set, and that this order is reversed upon a restore operation.

In FIG. 7, it will be noted that (as shown by the window arrangement illustrated to the right of the cache 28), that eight individual windows may be provided by such a cache memory. To provide eight windows, the same lines are used for the registers of windows 0 and 4, of windows 1 and 5, of windows 2 and 6, and of windows 3 and 7. The individual registers within any window are designated by the same register numbers used in FIGS. 1 and 4. The lines of the cache 28 each capable of being designated as a register as designated w[0] through w[63]. Blocks of eight registers assigned IN, local, and OUT values are designated blocks 0 through 7. In the logical equations, the "~" indicates a Boolean NOT operation, the "&" indicates a Boolean AND operation, the "" indicates a Boolean OR operation, and the ";" indicates a comment.

As discussed above, eight windows may be represented so the current window pointer is indicated in the cwp register by three bits, i.e. cwp[2 . . . 0], the number needed to represent eight distinct binary numbers. Five bits, i.e., ra[4 . . . 0], select a register address within a window. The upper two bits ra[4,3] select the block; three bits ra[2 . . . 0] select a register within any block of eight registers.

More generally, the address furnished in an instruction (which is for the purpose of this explanation called the virtual address) needs to be changed to the physical register address, the address actually used in the cache 28 to hold the information. The virtual address is designated by an address which includes a current window pointer value and a register address. Referring again to FIG. 3, in logic 38, the following logical equations provide this change of address:

Bits cwp[2 . . . 0] and ra[4 . . . 3] select a register block [w(n*8) through w((n*8)+7) for n=0 to 7] and bits ra[2 . . . 0] selects one register within that block. The equations for selecting a block are listed below. As an example, cwp=2 and ra=15 selects register w31.

GLOBAL registers are selected by ~ra[4]& ~ra[3] irrespective of the value of cwp[2 . . . 0], i.e., for each window.

```
w[2 . . 0] = ra[2 . . 0]
Register block w0-w7 (w[5 . . 3] = 0) is selected by:
    ~cwp[1] & ~cwp[0] & ra[4] & ~ra[3]              ;   LOCALS cwp = 0,4
Register block w8-w15 (w[5 . . 3] = 1) is selected by:
    (~cwp[1] & ~cwp[0] & ra[4] & ra[3])    |        ;   INS cwp = 0,4
    (~cwp[1] & cwp[0] & ~ra[4] & ra[3])             ;   OUTS cwp = 1,5
Register block w16-w23 (w[5 . . 3] = 2) is selected by:
    ~cwp[1] & cwp[0] & ra[4] & ~ra[3]               ;   LOCALS cwp = 1,5
Register block w24-w31 (w[5 . . 3] = 3) is selected by:
    (~cwp[1] & cwp[0] & ra[4] & ra[3])     |        ;   INS cwp = 1,5
    (cwp[1] & ~cwp[0] & ~ra[4] & ra[3])             ;   OUTS cwp = 2,6
Register block w32-w39 (w[5 . . 3] = 4) is selected by:
    cwp[1] & ~cwp[0] & ra[4] & ~ra[3]               ;   LOCALS cwp = 2,6
Register block w40-w47 (w[5 . . 3] = 5) is selected by:
    (cwp[1] & ~cwp[0] & ra[4] & ra[3])     |        ;   INS cwp = 2,6
    (cwp[1] & cwp[0] & ~ra[4] & ra[3])              ;   OUTS cwp = 3,7
Register block w48-w55 (w[5 . . 3] = 6) is selected by:
    cwp[1] & cwp[0] & ra[4] & ~ra[3]                ;   LOCALS cwp = 3,7
Register block w56-w63 (w[5 . . 3] = 7) is selected by:
    (cwp[1] & cwp[0] & ra[4] & ra[3])      |        ;   INS cwp = 3,7
    (~cwp[1] & ~cwp[0] & ~ra[4] & ra[3])            ;   OUTS cwp = 0,4
```

Thus, to select register block 0 (w0-w7), bits zero and one of the cwp pointer are both zero, bit four of the register address is one, and bit three of the register address is a zero. This selects the block used for storing local values in windows 0 and 4. The individual registers within the block are selected by the bits ra[2 . . . 0]. In like manner, to select register block 3(w24-w31), bits 1 of the cwp is a zero and bit 0 is a one while bits 4 of the register address are ones when the current window is 1 and 5. On the other hand, bit 1 is a one and bit 0 is a zero in the cwp while bit 4 is a zero and bit 3 is a one in the register address for the current windows 2 and 6.

Figure 8A:
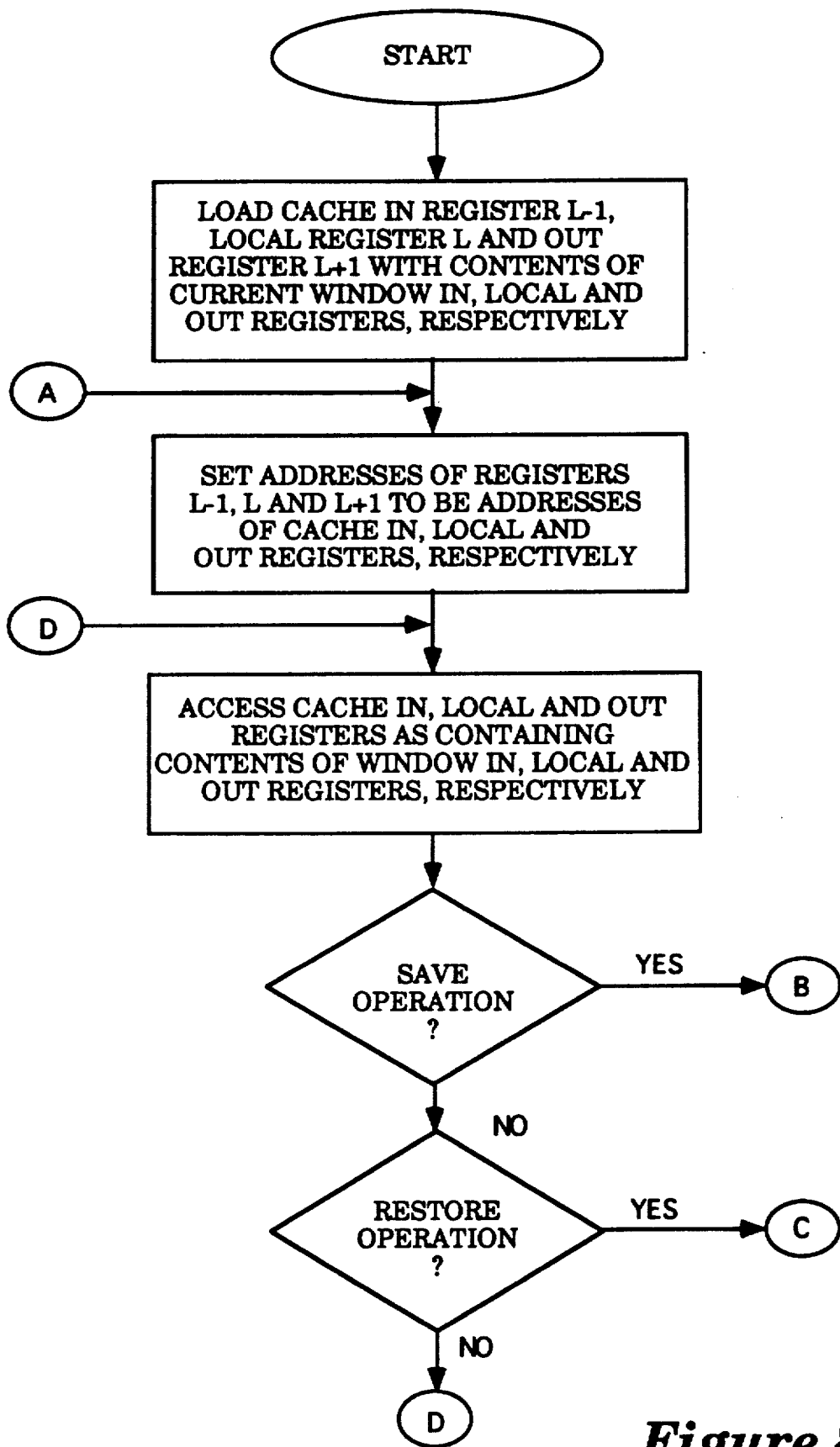
FIGS. 8a–c together comprise a flowchart illustrating the steps of the method of the present invention.
Figure 8B:
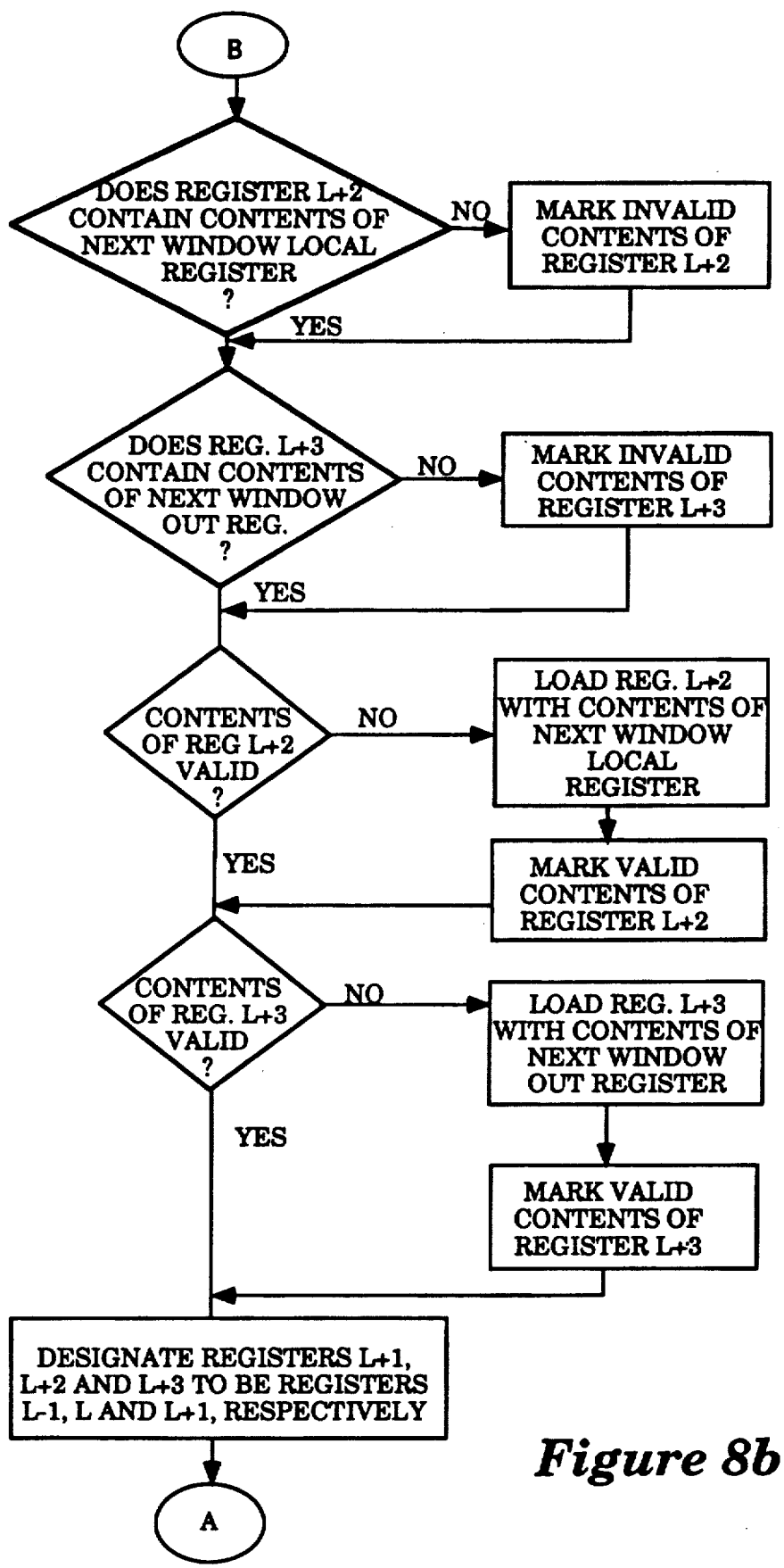
Figure 8C:
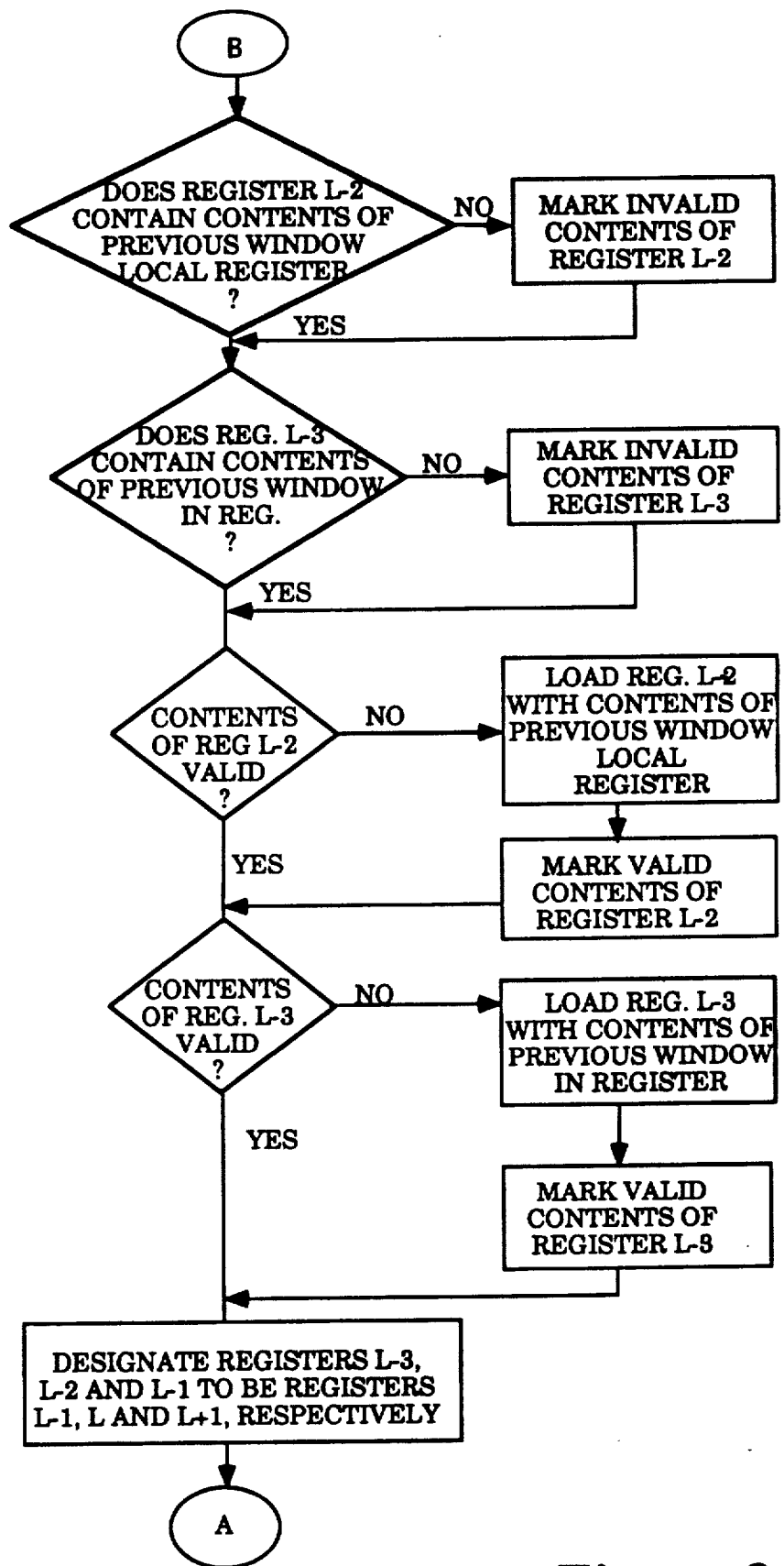

This logic provides for the changes of addresses necessary to take advantage of the information already stored in the cache 28 upon either a save or a restore operation. As a general rule (except as pointed out with FIG. 5), information in the OUT and local registers of the old window are invalidated upon a restore operation so that it is not used by the new window. FIGS. 8a-c together comprise a flowchart illustrating the steps of the method of the present invention.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A processor that executes a plurality of procedures wherein at least one of the procedures calls another of the procedures, said processor coupled to a plurality of windowing apparatae, each windowing apparatus of the windowing apparatae having a current window corresponding to an executing procedure, a previous window corresponding to a procedure which called the executing procedure and a next window corresponding to a procedure which is called by the executing procedure, each window having at least one IN register, each of the IN registers containing an input parameter value passed to the corresponding procedure by a calling procedure, at least one OUT register, each of the OUT registers containing an output parameter value passed from the corresponding procedure to a called procedure and at least one LOCAL register, wherein the IN register of a particular window is the OUT register of a logically succeeding window, the processor comprising:

an arithmetic and logic unit (ALU);

a windowed register cache, coupled between the windowing apparatae and the ALU, said cache comprising at least four cache registers, each of the cache registers accessible by the ALU as a cache IN register, a cache LOCAL register or a cache OUT register, the cache registers having a logical sequence whereby the last cache register is logically adjacent to the first cache register such that if a cache register of the at least four registers is designated as register L, register L+1 is the cache register logically succeeding the register L, register L+2 is the cache register logically succeeding the register L+1, register L+3 is the cache register logically succeeding the register L+2, register L−1 is the cache register logically preceding the register L, register L−2 is the cache register logically preceding the register L−1, register L−3 is the cache register logically preceding the register L−2, the contents of the current window contained in the cache such that the cache IN register (the register L−1) contains contents of the current window IN register, the cache LOCAL register (the register L) contains contents of the current window LOCAL register and the cache OUT register (the register L+1) contains contents of the current window OUT register, the cache IN, LOCAL, and OUT registers are accessed by the ALU as containing the contents of the respective current window IN, LOCAL and OUT registers;

said windowed register cache further comprising logic means for controlling loading of, and access to, said windowed register cache such that if the procedure corresponding to the current window calls the procedure corresponding to the next window and the register L+2 does not contain the contents of the next window LOCAL register, the register L+2 is loaded by the logic means with contents of the next window LOCAL register, and if the procedure corresponding to the current window calls the procedure corresponding to the next window and the register L+3 does not contain the contents of the next window OUT register, the register L+3 is loaded by the logic means with contents of the next window OUT register, then if the procedure corresponding to the current window calls the procedure corresponding to the next window, the registers L+1, L+2 and L+3 are identified by the ALU respectively as the new cache IN, LOCAL and OUT registers such that the cache registers are accessed by the ALU as containing the contents of the respective next window IN, LOCAL and OUT registers;

if the procedure corresponding to the current window returns to the procedure corresponding to the previous window and the register L−2 does not contain the contents of the previous window LOCAL register, the register L−2 is loaded by the logic means with contents of the previous window LOCAL register, and if the procedure corresponding to the current window returns to the procedure corresponding to the previous window and the register L−3 does not contain the contents of the previous window IN register, the register L−3 is loaded by the logic means with contents of the previous window IN register, then if the procedure corresponding to the current window returns to the procedure corresponding to the previous window, the registers L−1, L−2 and L−3 are identified by the ALU respectively as the new cache OUT, LOCAL and IN registers such that the cache registers are accessed by the ALU as containing the contents of the respective previous window OUT, LOCAL and IN registers.

2. The processor as set forth in claim 1 wherein the procedure corresponding to the current window calls the procedure corresponding to the next window during a SAVE operation, the procedure corresponding to the current window returns to the procedure corresponding to the previous window during a RESTORE operation, each of the cache registers are identified by an address and the addresses of he new cache IN, LOCAL and OUT registers are changed by the logic means to the addresses of the old cache IN, LOCAL and OUT registers respectively during the SAVE and RESTORE operations.

3. The processor as set forth in claim 2 wherein:

the contents of the register that will become the new cache LOCAL register during a SAVE operation are designated invalid by the logic means immediately prior to the SAVE operation, if the new cache LOCAL register does not contain the contents of the next window LOCAL register;

the contents of the register that will become the new cache OUT register during a SAVE operation are designated invalid by the logic means immediately prior to the SAVE operation, if the new cache OUT register does not contain the contents of the next window OUT register;

the contents of the register that will become the new cache LOCAL register during a RESTORE operation are designated invalid by the logic means immediately prior to the RESTORE operation, if the new cache LOCAL register does not contain the contents of the previous window LOCAL register;

the contents of the register that will become the new cache IN register during a RESTORE operation are designated invalid by the logic means immediately prior to the RESTORE operation, if the new cache IN register does not contain the contents of the previous window IN register; and only the registers with contents designated invalid are loaded by the logic means during the SAVE and RESTORE operations.

4. The processor as set forth in claim 1 wherein each of the window IN, LOCAL and OUT registers and each of the cache registers comprise a plurality of registers.

5. A processor that executes a plurality of procedures wherein at least one of the procedures calls another of the procedures, said processor coupled to a plurality of windowing apparatae, each windowing apparatus of the windowing apparatae having a current window corresponding to an executing procedure, a previous window corresponding to a procedure which called the executing procedure and a next window corresponding to a procedure which is called by the executing procedure, each window having at least one IN register, each of the IN registers containing an input parameter value passed to the corresponding procedure by a calling procedure, at least one OUT register, each of the OUT registers containing an output parameter passed from the corresponding procedure to a called procedure and at least one LOCAL register, wherein the IN register of a particular window is the OUT register of a logically succeeding window, the processor comprising:

an arithmetic and logic unit (ALU);

a windowed register cache, coupled between the windowing apparatae and the ALU, said cache comprising at least four cache registers, each of the cache registers accessible by the ALU as a cache IN register, a cache LOCAL register or a cache OUT register, each of the cache registers identified by an address, the cache registers having a logical sequence whereby the last cache register is logically adjacent to the first cache register such that if a cache register of the at least four registers is designated as register L, register L+1 is the cache register logically succeeding the register L, register L+2 is the cache register logically succeeding the register L+1, register L+3 is the cache register logically succeeding the register L+2, register L−1 is the cache register logically preceding the register L, register L−2 is the cache register logically preceding the register L−1, register L−3 is the cache register logically preceding the register L−2, the contents of the current window contained in if the procedure corresponding to the current window returns to the procedure corresponding to the previous window and the register L−3 does not contain the contents of the previous window IN register, the register L−3 is loaded by the logic means with contents of the previous window IN register, then if the procedure corresponding to the current window returns to the procedure corresponding to the previous window, the registers L−1, L−2 and L−3 are identified by the ALU respectively as the new cache OUT, LOCAL and IN registers, and have their addresses changed by the logic means to the addresses of the respective old cache OUT, LOCAL and IN registers, such that the cache registers are accessed by the ALU as containing the contents of the respective previous window OUT, LOCAL and IN registers.

6. The processor as set forth in claim 5 the procedure corresponding to the current window calls the procedure corresponding to the next window during a SAVE operation, the procedure corresponding to the current window returns to the procedure corresponding to the previous window during a RESTORE operation, and wherein:

the contents of the register that will become the new cache LOCAL register during a SAVE operation are designated invalid by the logic means immediately prior to the SAVE operation, if the new cache LOCAL register does not contain the contents of the next window LOCAL register;

the contents of the register that will become the new cache OUT register during a SAVE operation are designated invalid by the logic means immediately prior to the SAVE operation, if the new cache OUT register does not contain the contents of the next window OUT register;

the contents of the register that will become the new cache LOCAL register during a RESTORE operation are designated invalid by the logic means immediately prior to the RESTORE operation, if the new cache LOCAL register does not contain the contents of the previous window LOCAL register;

the contents of the register that will become the new cache IN register during a RESTORE operation are designated invalid by the logic means immediately prior to the RESTORE operation, if the new cache IN register does not contain the contents of the previous window IN register; and only the registers with contents designated invalid are loaded by the logic means during the SAVE and RESTORE operations.

7. The processor as set forth in claim 5 wherein each of the window IN, LOCAL and OUT registers and each of the cache registers comprise a plurality of registers.

8. In a processor comprising an arithmetic and logic unit (ALU), said processor executing a plurality of procedures wherein at least one of the procedures calls another of the procedures, the processor coupled to a plurality of windowing apparate, each windowing apparatus to the windowing apparatae having a current window corresponding to an executing procedure, a previous window corresponding to a procedure which called the executing procedure, and a next window corresponding to a procedure which is called by the executing procedure, each window having at least one IN register, each of the IN registers containing an input parameter passed to the corresponding procedure by a calling procedure, at least one OUT register, each of the OUT registers containing an output parameter passed from the corresponding procedure to a called procedure and at least one LOCAL register, wherein the IN register of a particular window is the OUT register of a logically succeeding window, the processor further comprising a windowed register cache, coupled between the windowing apparatae and the ALU, said cache comprising at least four cache registers, each of the cache registers accessible by the ALU as a cache IN register, a cache LOCAL register or a cache OUT register, the cache registers having a logical sequence whereby the last cache register is logically adjacent to the first cache register such that if a cache register of the at least four registers is designated as register L, register $L+1$ is the cache register logically succeeding the register L, register $L+2$ is the cache register logically succeeding the register $L+1$, register $L+3$ is the cache register logically succeeding the register $L+2$, register $L-1$ is the cache register logically preceding the register L, register $L-2$ is the cache register logically preceding the register $L-1$, register $L-3$ is the cache register logically preceding the register $L-2$, a method for caching the windows to increase the speed of access to the windows, said method comprising the steps of:

loading contents of the current window into the cache such that the cache IN register (the register $L-1$) contains contents of the current window IN register, the cache LOCAL register (the register L) contains contents of the current window LOCAL register and the cache OUT register (the register $L+1$) contains contents of the current window OUT register such that the cache IN, LOCAL, and OUT registers are accessed by the ALU as containing the contents of the respective current window IN, LOCAL and OUT registers;

if the procedure corresponding to the current window calls the procedure corresponding to the next window and the register $L+2$ does not contain the contents of the next window LOCAL register, loading the register $L+2$ with contents of the next window LOCAL register, and if the procedure corresponding to the current window calls the procedure corresponding to the next window and the register $L+3$ does not contain the contents of the next window OUT register, loading the register $L+3$ with contents of the next window OUT register, then if the procedure corresponding to the current window calls the procedure corresponding to the next window, the ALU identifying the registers $L+1$, $L+2$ and $L+3$ respectively as the new cache IN, LOCAL and OUT registers such that the ALU accesses the cache registers as the respective next window IN, LOCAL and OUT registers;

if the procedure corresponding to the current window returns to the procedure corresponding to the previous window and the register $L-2$ does not contain the contents of the previous window LOCAL register, loading the register $L-2$ with contents of the previous window LOCAL register, and if the procedure corresponding to the current window returns to the procedure corresponding to the previous window and the register $L-3$ does not contain the contents of the previous window IN register, loading the register $L-3$ with contents of the previous window IN register, then if the procedure corresponding to the current window returns to the procedure corresponding to the previous window, the ALU identifying the register $L+1$, $L+2$ and $L+3$ respectively as the new cache OUT, LOCAL and IN registers such that the ALU accesses the cache registers as the respective previous window OUT, LOCAL and IN registers.

9. The caching method as set forth in claim 8 wherein the procedure corresponding to the current window calls the procedure corresponding to the next window during a SAVE operation.

10. The caching method as set forth in claim 9 wherein the procedure corresponding to the current window returns to the procedure corresponding to the previous window during a RESTORE operation.

11. The caching method as set forth in claim 10 wherein the cache registers are identified by an address and further comprising the step of:

changing the addresses of the new cache IN, LOCAL and OUT registers to the addresses of the old cache IN, LOCAL and OUT registers respectively during the SAVE and RESTORE operations.

12. The caching method as set forth in claim 10 further comprising the steps of:
- designating invalid the contents of the register that will become the new cache LOCAL register during a SAVE operation, immediately prior to the SAVE operation, if the new cache LOCAL register does not contain the contents of the next window LOCAL register;
- designating invalid the contents of the register that will become the new cache OUT register during a SAVE operation, immediately prior to the SAVE operation, if the new cache OUT register does not contain the contents of the next window OUT register;
- designating invalid the contents of the register that will become the new cache LOCAL register during a RESTORE operation, immediately prior to the RESTORE operation, if the new cache LOCAL register does not contain the contents of the previous window LOCAL register;
- designating invalid the contents of the register that will become the new cache IN register during a RESTORE operation, immediately prior to the RESTORE operation, if the new cache IN register does not contain the contents of the previous window IN register; and
- only the registers with contents designated invalid are loaded during the SAVE and RESTORE operations.

* * * * *

UNITED STATES PATENT AND TRADEMARK OFFICE
CERTIFICATE OF CORRECTION

PATENT NO. : 5,179,682

DATED : January 12, 1993

INVENTOR(S) : Jensen

It is certified that error appears in the above-identified patent and that said Letters Patent is hereby corrected as shown below:

In column 14, claim 5 at line 44, please delete " in " and insert -- in the cache such that the cache IN register (the register L-1) contains contents of the current window IN register, the cache LOCAL register (the register L) contains contents of the current window LOCAL register and the cache OUT register (the register L+1) contains contents of the current window OUT register, the cache IN, LOCAL, and OUT registers are accessed by the ALU as containing the contents of the respective current window IN, LOCAL and OUT registers;

said windowed register cache further comprising logic means for controlling loading of, and access to, said windowed register cache such that if the procedure corresponding to the current window calls the procedure corresponding to the next window and the register L+2 does not contain the contents of the next window LOCAL register, the L+2 register is loaded by the logic means with contents of the next window LOCAL register, and if the procedure corresponding to the current window calls the procedure corresponding to the next window and the register L+3 does not contain the contents of the next window OUT register, the L+3 register is loaded by the logic means with contents of the next window OUT register, then if the procedure corresponding to the current window calls the procedure corresponding to the next window, the registers L+1, L+2, and L+3 are identified by the ALU respectively as the new cache IN, LOCAL and OUT registers, and have their addresses changed by the logic means to the addresses of the respective old cache IN, LOCAL and OUT registers, such that the cache registers are accessed by the ALU as containing the contents of the respective next window IN, LOCAL and OUT registers;

UNITED STATES PATENT AND TRADEMARK OFFICE
CERTIFICATE OF CORRECTION

PATENT NO. : 5,179,682
DATED : January 12, 1993  PAGE 2 OF 2
INVENTOR(S) : Jensen It is certified that error appears in the above-identified patent and that said Letters Patent is hereby corrected as shown below:

if the procedure corresponding to the current window returns to the procedure corresponding to the previous window and the register L+2 does not contain the contents of the previous window LOCAL register, the register L-2 is loaded by the logic means with contents of the previous window LOCAL register, and --

In column 15, claim 8 at line 40, please delete " to " and insert -- of --.

Signed and Sealed this

Sixteenth Day of September, 1997

*Attest:*

BRUCE LEHMAN

*Attesting Officer*  Commissioner of Patents and Trademarks